United States Patent [19]

Poisel et al.

[11] Patent Number: 4,962,311

[45] Date of Patent: Oct. 9, 1990

[54] DEVICE FOR DETERMINING THE DIRECTION OF INCIDENT LASER RADIATION

[75] Inventors: Hans Poisel, Dachau; Martina Schreiber; Gerd Trommer, both of Munich, all of Fed. Rep. of Germany

[73] Assignee: Messerschmitt-Bölkow-blohm GmbH, Munich, Fed. Rep. of Germany

[21] Appl. No.: 350,719

[22] Filed: May 11, 1989

[30] Foreign Application Priority Data

May 28, 1988 [DE] Fed. Rep. of Germany ....... 3818229

[51] Int. Cl.$^5$ .............................................. G01B 11/26
[52] U.S. Cl. ................................ 250/216; 250/227.11; 356/152
[58] Field of Search .................... 250/216, 227, 203 R; 356/141, 152

[56] References Cited

U.S. PATENT DOCUMENTS

| 4,498,768 | 2/1985 | Holl | 250/216 |
|---|---|---|---|
| 4,625,108 | 11/1986 | Nestel et al. | 250/227 |
| 4,674,874 | 6/1987 | Halldorsson et al. | 356/152 |
| 4,778,990 | 10/1988 | Laughlin | 356/141 |
| 4,825,063 | 4/1989 | Halldorsson et al. | 250/203 R |
| 4,880,305 | 11/1989 | Salt | 250/227 |

Primary Examiner—Edward P. Westin
Attorney, Agent, or Firm—Kenyon & Kenyon

[57] ABSTRACT

A detector device for the directionalized detection of laser radiation has a plurality of individual optics, which together can measure radiation throughout a defined total angle of detection. Each individual optical system comprises a fiber optic guide with a corresponding light concentrator, which has a generally funnel-shaped, dynamically balanced design, tapered towards the end of the fiber optic guide. The funnel wall reflects inwardly and is shaped, so that the following condition is fulfilled:

$$A_K \sin^2 \theta_{max} > A_F \sin^2 \theta_g.$$

3 Claims, 2 Drawing Sheets

DEVICE FOR DETERMINING THE DIRECTION OF INCIDENT LASER RADIATION

BACKGROUND OF THE INVENTION

The present invention relates to a detector device for the directionalized detection of laser radiation. The detector device is of the type which includes a plurality of individual optical detectors which, together, can measure radiation throughout a defined total angle of detection. The range of detection of adjacent individual optical devices overlap each other. Moreover, each individual optical device comprises a fiber optic guide connected to a corresponding light concentrator, which concentrator has a generally funnel-shaped, dynamically balanced design which is tapered towards the end of the fiber optic guide.

Today, laser radiation in the visible or infrared range is used in many applications, either as a pulsed or intensity modulated laser radiation, for example, for range determination, target illumination, or to identify the destination of a missile and to control it directly.

To locate and identify laser radiation, even in the presence of a disturbing background radiation, it is necessary to analyze the characteristic features of the laser radiation, such as, for example, its wavelength and signature, with regard to the pulse length and the pulse rate of repetition, as well as the direction of incidence.

Thus, according to the particular field of use, different requirements are placed on the width of the angle of detection, as well as on the angular resolution of a laser warning sensor, both in the azimuth direction and in the direction of elevation. In order to completely detect laser radiation throughout a coverage range of 360° in the azimuth plane and a defined angular range in the plane of elevation (this means each plane, which is perpendicular to the azimuth plane), a plurality of individual optical devices is necessary. They are usually arranged on a hemisphere, to enable the directionalized detection, with high angular resolution, of different sources of laser radiation.

A detector device designed as a laser warning sensor for the directionalized detection of laser radiation is known from European patent application No. 87104470; wherein a plurality of individual optical detectors is provided with each individual optical system including a first and a second fiber optic guide, each of which is connected to a first and a second detector stage, respectively. All of the fiber optic guides connected to the first detector stage are of the same length, while the second fiber optic guides connected to the second detector stage are, relative to each other, of different lengths. The individual optical detectors each comprise an end of a fiber optic guide and a spherical lens arranged in front of the end of the fiber optic guide. The spherical lens arrangement, however, has the disadvantages of a restricted coverage range of approximately ±10°, a possible chromatic image defect, and a restricted spectral region.

An optical arrangement for detecting electromagnetic radiation is also known from German Published Patent Application No. 26 48 704. This publication describes a radiation collector extending out from a surface of incidence to a radiation collecting surface. The collector is in the form of radiation reflecting surfaces, which surround an inner medium having a refractive index which is greater than that of an outer medium. In addition, the radiation collector is of a concave configuration such that the reflecting surfaces totally reflect, with maximum possible efficiency, the radiation entering through the surface of incidence onto the collecting surface.

The radiation collector is a generally funnel-shaped light concentrator which is designed such that the incident radiation is collected and concentrated, as uniformly as possible, within a defined angular range $0 < \theta_{max}$. This means that the receiving characteristic has a step function form. Accordingly, the light concentrator is designed with a concentration factor of $c^2$ ($c^2$ = surface of incidence/surface of emergence), which most closely approaches the ideal case, as defined by Abbe's sine law from the Liouville theorem as follows:

$$c^2_{opt} = \sin^2\theta_g / \sin^2\theta_{max}$$

(see also J. Opt. Soc. Am. Vol. 60, page 245 (1970)), wherein $\theta_g$ is the maximum permissible angle of emergence from the light concentrator (this means at least 90°), and $\theta_{max}$ is the maximum acceptance angle of the light concentrator.

Thus, the known light concentrator corresponds, as closely as possible, to the following equation:

$$A_k \sin^2\theta_{max} = A_F \sin^2\theta_g$$

in order to fulfill the requirement, as indicated above, for uniform light concentration in the defined angular range.

If, for cost reasons, only a few individual optical systems are to be used in a laser warning sensor, which nevertheless is to cover a full range of detection, e.g., 360°, then the clearance between angles of detection of adjacent individual optical detectors must be designed accordingly. In order to avoid blind spots, the individual optical detectors must each have an acceptance angle of a preselected size. To guarantee a high enough angular resolution, an interpolation between the individual optical detectors is necessary. This requires a steady form of receiving characteristic without sudden changes, for example, to provide a triangular characteristic of the interpolation in a one-dimensional representation, as illustrated in FIG. 2. A step function, such as, for example, that of the concentrator in the above-discussed German Published Patent Application No. 26 48 704, is, therefore, not suited for such an interpolation.

It has turned out, that in the case of the known laser warning systems, it is not possible to arbitrarily form the receiving characteristic with a defined maximum acceptance angle by altering the three degrees of freedom, which are the diameter of the spherical lens, the diameter of the fiber optic guide and the distance between the fiber and the spherical lens.

Summary of the Invention

The primary objective of the present invention is to provide a detector device operating as a laser warning sensor, which includes considerably fewer individual optical systems than used in previously known systems while continuously covering a 360° range of detection with uniform angular resolution and having a receiving characteristic or responsivity curve with only small gradients.

The present invention comprises a detector device of the type including a funnel-shaped light concentrator wherein the funnel wall is a reflecting wall and is formed such that the following condition is fulfilled:

$$A_k \sin^2\theta_{max} > A_F \sin^2\theta_g$$

wherein: $A_k$ is the surface area of the light-receiving aperture of the light concentrator, $A_F$ is the surface area of the fiber optic guide, $\theta_{max}$ is the maximum acceptance angle of the individual optical detector comprising the light concentrator and the fiber optic guide, and $\theta_g$ is the fiber acceptance angle, defined by the numerical aperture $A_n = \sin\theta_g$ of the fiber optic guide. Only by meeting the above condition, is it possible to form receiving characteristics with small gradients.

In one embodiment of the present invention, the funnel wall has the shape of a paraboloid of revolution, define by the following equation: $y = 1/2p \ x^2$ wherein $p = R_F \tan(\theta_g/2)$ ($R_f$ being the radius of the fiber optic guide).

Such an inwardly reflecting funnel-type light concentrator, in front of the end of a fiber optic guide, provides an individual optical system with a receiving characteristic which is suitable for interpolating, as depicted in FIG. 2, for two adjacent individual optical systems. The contour of the funnel walls of each individual optical system is described mathematically by surfaces of higher order, whereby the degree of order is determined by the desired number of degrees of freedom for the formation of the responsivity curve $S(\theta)$. Such a curve shape (or also a curve shape of two overlapping triangles) is suited to make an unambiguous interpolation between two adjacent individual optical systems.

With the refinement of the individual optics, according to the invention, the advantage is also attained, that, in principle, the range of coverage of the fiber optic guide is variable, without limits. In order to reduce the size of the acceptance angle of the individual optics alone, relative to the acceptance angle of the fiber optic guide, the light concentrator is tapered towards the fiber optic guide and, in order to enlarge the acceptance angle, the light concentrator widens towards the fiber optic guide. Due to the angle of reflection, which is independent of wavelength, on the reflecting inner wall of the light concentrator, the receiving characteristic remains independent of wave length.

The present invention will now be described in greater detail in the following detailed description with reference to the accompanying drawings.

Detailed Description

Figure 1:
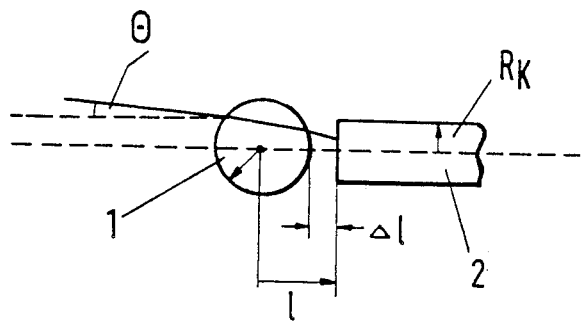
FIG. 1 schematically depicts a view of a conventional individual optical system.

An individual prior art optical system is depicted in Fig. 1, which consists of a spherical lens 1, which is arranged at a distance in front of a fiber optic guide 2. The distance from the surface of the sphere to the end of the fiber is designated with $\Delta 1$, and the distance from the center point of the sphere to the surface of incidence of the fiber with 1. The maximum acceptance angle of the individual optics is designated with $\theta_{max}$, the radius of the fiber optic guide with $R_k$, and the radius of the spherical lens with $R_1$.

Such an individual optical system, including a spherical lens, is encumbered by a restricted coverage range with chromatic image defects and by a restricted spectral region. Due to the limited acceptance angle of the adjacent individual optical detectors, many such detectors have to be arranged, for example, on a spherical shell, in order to cover a complete range of detection.

Figure 2:
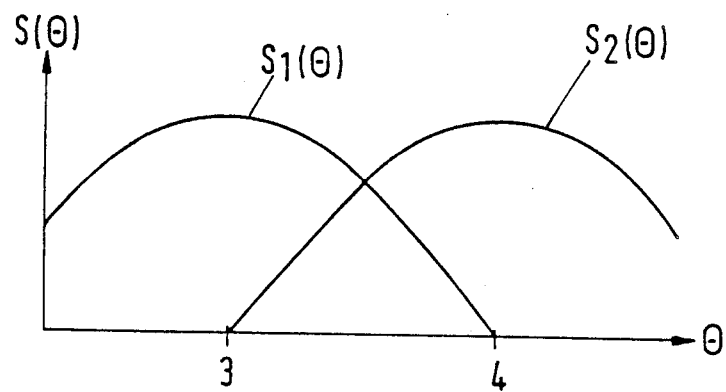
FIG. 2 illustrates the system responsivity curves of two individual optical systems, according to the invention, which are suitable to make an interpolation.

A reduction in the number of individual optical detectors while maintaining full coverage of radiation detection requires system responsivity curves, as they are represented in FIG. 2, for two adjacent individual optical detectors 3, 4. Such overlapping (preferably triangular-shaped) soft system responsivity curves with small gradients allow for exact interpolations, so that the distance between the individual optics can be increased, and therewith their number can be reduced, without causing the angular resolution to diminish.

Figure 3:
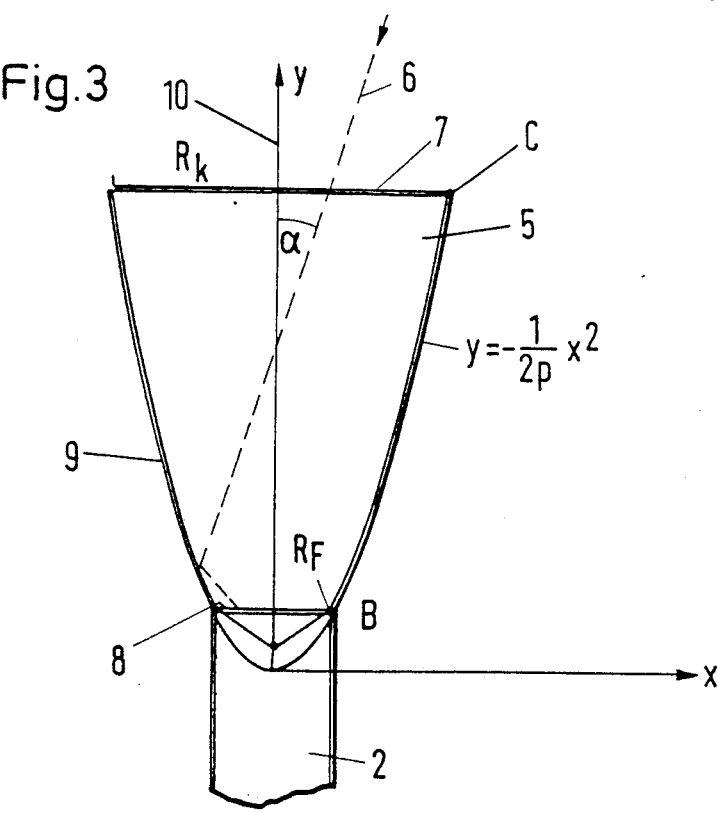
FIG. 3 illustrates a section of an individual optical detector, according to the present invention

FIG. 3 illustrates a section through an individual optical system, according to the present invention, with which such system responsivity curves $S(\theta)$ suitable for interpolation can be obtained. This type of individual optical device comprises a fiber optic guide 2 and a dynamically balanced light concentrator 5, arranged directly in front of the mounting surface of the fiber optic guide 2. The concentrator 5 is generally funnel-shaped and is tapered towards the end of the fiber optic guide 2. The wall 9 of the light concentrator is mirror-coated so that an incident light ray 6 is reflected in the direction of the receiving surface of the fiber optic guide 2.

Pursuant to the invention, the wall of the funnel 5 is shaped, so that the following condition is fulfilled:

$$A_k \sin^2\theta_{max} > A_F \sin^2\theta_g$$

wherein $A_k$ is the surface area of the light-receiving aperture 7 of the light concentrator 5, $A_F$ is the surface area of incidence 8 of the fiber optic guide 2, $\theta_{max}$ is the maximum acceptance angle of the individual optical detector comprising the light concentrator 5 and the fiber optic guide 2, and $\theta_g$ is the fiber acceptance angle defined by the numerical aperture $An = \sin\theta_g$ of the fiber optic guide 2. The radius of the fiber optic guide is designated with $R_F$, and the radius of the light concentrator is designated with $R_k$.

With this type of refinement of the light concentrator, the desired receiving characteristic of the individual optics $S(\theta)$ is attained, according to FIG. 2. To interpolate properly between two adjacent individual optics, it is important thereby, that the curve $S(\theta)$ not be rectangular-shaped, but rather either triangular-shaped or approximately triangular-shaped, as illustrated in FIG. 2.

The light concentrator 5, represented schematically in FIG. 3, can be a paraboloid of revolution, symmetrical to the longitudinal axis 10, which is defined by the following equation: $y = 1(2p) \cdot x^2$, wherein $p = R_F \tan(\theta g/2)$. This results in coordinates for the point B of $x_g = R_F$ and for the point C of $$x_c = R_F + 2p/\tan\theta_{max}.$$

Figure 4:
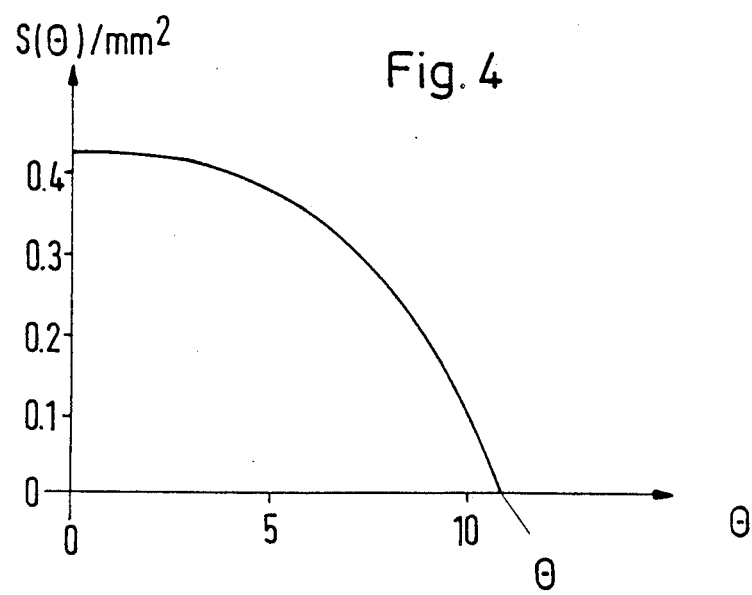
FIG. 4 depicts the system responsivity that can be attained with the individual optical system of the present invention.

The receiving characteristic $S(\theta)$, depicted in FIG. 4, was obtained with an individual optical device, according to the invention, having the following dimensions: $R_F = 0.15$ mm, $\theta_g = 22°$, $R_k = 0.37$ mm, $p = 0.03$ and $\theta_{max}=11°$. Accordingly, $A_k = 0.43$ mm$^2$ and $A=0.07$ mm$^2$ and therefore: $A_k \sin^2\theta_{max}=0.0157 > A_F \sin^2\theta_g = 0.0099$.

Thereby, the condition defined according to the invention is fulfilled, that the surface area of incidence $A_k$ is considerably larger than the term $A_F \sin^2\theta_g / \sin^2\theta_{max}$.

In place of a mirror coating on the concentrator wall 9, it is also conceivable to attain reflection through total reflection by means of refractive indexes of different amounts between the concentrator material and the outer medium.

What is claimed is:

1. A detector device for the directionalized detection of laser radiation including a plurality of individual optical detectors which measure radiation throughout a defined total angle of detection, wherein the angle of detection of adjacent individual optical detectors overlap each other, and wherein each individual optical detector comprises a fiber optic guide optically coupled to a corresponding light concentrator, which concentrator has a generally funnel-shaped, dynamically balanced design, including a funnel wall tapered towards the end of the fiber optic guide, and wherein the funnel wall has a reflecting surface and is formed such that the following condition is fulfilled:

$$A_k \sin^2\theta_{max} > A_F \sin^2\theta_g$$

wherein: $A_k$ is the surface area of the light-receiving aperture of the light concentrator, $A_F$ is the surface area of the fiber optic guide, $\theta_{max}$ is the maximum acceptance angle of the individual optical detector, and $\theta_g$ is the fiber acceptance angle, defined by the numerical aperture $A_n = \sin\theta_g$ of the fiber optic guide.

2. The detector device of claim 1, wherein the funnel wall is mirror-coated.

3. The detector device of claim 1, wherein the funnel wall has a totally reflecting surface.

* * * * *